United States Patent
Mir et al.

(10) Patent No.: US 12,192,388 B2
(45) Date of Patent: Jan. 7, 2025

(54) GENERATING AND MANAGING IMMUTABLE LICENSE GRANT RECORDS FOR AUTHORIZED DERIVATIVE WORKS

(71) Applicant: Aria Mir, Beverly Hills, CA (US)

(72) Inventors: Aria Mir, Beverly Hills, CA (US); Andrew Whitesides Lloyd, Newport Beach, CA (US)

(73) Assignee: Aria Mir, Beverly Hills, CA (US)

( * ) Notice: Subject to any disclaimer, the term of this patent is extended or adjusted under 35 U.S.C. 154(b) by 260 days.

(21) Appl. No.: 18/048,409

(22) Filed: Oct. 20, 2022

(65) Prior Publication Data

US 2023/0130182 A1  Apr. 27, 2023

Related U.S. Application Data

(60) Provisional application No. 63/270,495, filed on Oct. 21, 2021.

(51) Int. Cl.
 *H04L 9/00* (2022.01)
 *H04L 9/30* (2006.01)
 *H04L 9/32* (2006.01)

(52) U.S. Cl.
 CPC .............. *H04L 9/50* (2022.05); *H04L 9/30* (2013.01); *H04L 9/3247* (2013.01)

(58) Field of Classification Search
 CPC ............ H04L 9/50; H04L 9/30; H04L 9/3247
 USPC ....................................................... 713/189
 See application file for complete search history.

(56) References Cited

U.S. PATENT DOCUMENTS

| | | | |
|---|---|---|---|
| 10,853,902 B2 | 12/2020 | Atkinson et al. | |
| 10,922,772 B2 | 2/2021 | Chen et al. | |
| 11,301,452 B2 | 4/2022 | Chan et al. | |
| 2017/0134162 A1 | 5/2017 | Code et al. | |
| 2019/0005595 A1 | 1/2019 | Tautenhan et al. | |
| 2019/0318348 A1 | 10/2019 | Brenner et al. | |
| 2020/0134139 A1* | 4/2020 | Vaish ................... | G06F 16/1805 |
| 2021/0243201 A1 | 8/2021 | Tandel et al. | |
| 2022/0075845 A1* | 3/2022 | Bowen .................... | G06F 30/30 |

(Continued)

OTHER PUBLICATIONS

Economist, "Bored Ape Yacht Club: the Case for Licensed Commercial Use Rights", https://medium.com/@deconomist/bored-ape-yacht-club-the-case-for-licensed-commercial-use-rights-b1bbd463d189, Medium, Sep. 17, 2021, in 14 pages.

(Continued)

*Primary Examiner* — Liang Che A Wang
(74) *Attorney, Agent, or Firm* — Knobbe, Martens, Olson & Bear, LLP

(57) ABSTRACT

Systems and methods are described for generating and storing immutable blockchain records with respect to authorized derivative works based on content associated with a non-fungible token (NFT). For example, a first NFT stored on a blockchain may be owned by a first blockchain address, and that owner may cryptographically sign a message indicating or representing that the individual approves of a created or to-be-created second NFT that is based at least in part on content of or associated with the first NFT. The cryptographic signature may be authenticated, and then a system may generate new data for storage in a new blockchain record. The new blockchain record may identify both the first NFT and the second NFT, and also include data proving that the owner of the first NFT approved of the second NFT.

20 Claims, 7 Drawing Sheets

(56) References Cited

U.S. PATENT DOCUMENTS

| | | | |
|---|---|---|---|
| 2022/0215075 A1* | 7/2022 | Goldston | G06F 16/41 |
| 2022/0414809 A1* | 12/2022 | Geng | H04L 9/50 |
| 2023/0073545 A1* | 3/2023 | Kurian | G06Q 20/401 |
| 2023/0080833 A1* | 3/2023 | Young | H04L 9/0866 |
| | | | 713/168 |

OTHER PUBLICATIONS

Coinyuppie, "Encrypted avatar secondary development NFT derivatives may become 'life-saving medicine'", https://coinyuppie.com/encrypted-avatar-secondary-development-nft-derivatives-may-become-life-saving-medicine/, Sep. 24, 2021, in 16 pages.

Apewell, "What is 10KTF?", Sep. 24, 2021, https://www.apewell.com/post/what-is-10ktf, in 4 pages.

Wenew, Inc, "Warm Wallet, Use your cold wallet's NFT safely—FAQ", https://warm.xyz/faq, as printed Oct. 17, 2022, in 3 pages.

\* cited by examiner

FIG. 1A

Logged in as John123
Address: 0x453...8891

Create or authorize creation of a new NFT inspired by or based on an NFT in your wallet

Select one of your eligible NFTs below:

Simple Snakes #99

ArtZ #235

FIG. 1B

Logged in as John123
Address: 0x453...8891

Project: Simple Snakes

Token #99

Rights granted to you by Simple Snakes creator include:

Full commerical use, derivative work creation, more

<u>Upload file</u>, or approve someone to create a new NFT based on your Simple Snakes #99:

Authorized creator: [TylerD]

Number of new NFTs allowed for creation: [5]

Duplicates allowed? [No]

Blockchain for mints: [Ethereum ▼]

Limitations on creator beyond standard terms: [None ▼]

I want to approve content before mint: [Yes ▼]

Owner of new NFTs upon mint: [Me ▼]

Optionally you may specify <u>a payment</u> between you or the artist to trigger upon mint

[Sign Approval]

Create Token — 130

Logged in as TylerD
Address: 0x124...7382

User John123, the current owner of Simple Snakes #99, has approved you to create up to 5 derivative NFTs based on Simple Snakes #99. View Terms — 132

John123 requires approval of work prior to NFT minting. Once your image, video or other content is finalized:

1) Provide the image, video or other media file as an upload or enter public file location (such as an IPFS identifier)
2) Enter properties or upload metadata (such as a JSON file) — 134
3) Select mint mechanism:
   ○ Mint for me upon approval
   ○ I'll mint elsewhere John123 has set mints to send to his wallet, and no payment to occur between the two of you. Request change — 136

[Send for approval and minting]

Derivative Token Approval — 140

Logged in as John123
Address: 0x453...8891

— 114

User TylerD has created the above image for your approval for minting as a new NFT inspired by your Simple Snakes #99, with the below properties or metadata: — 142

Collection: Tyler's Reimagined Snakes

Background: Burst

Snake skin: Streaked

Head: Dotted — 144

View property rarity among collection

The new NFT will mint to your wallet upon your approval — 146

[Approve for minting]

FIG. 1D

GENERATING AND MANAGING IMMUTABLE LICENSE GRANT RECORDS FOR AUTHORIZED DERIVATIVE WORKS

PRIORITY AND INCORPORATION BY REFERENCE

This application claims benefit of U.S. Provisional Patent Application No. 63/270,495, entitled "GENERATING AND MANAGING IMMUTABLE LICENSE GRANT RECORDS FOR AUTHORIZED DERIVATIVE WORKS," filed Oct. 21, 2021, which is hereby incorporated by reference in its entirety. Any and all applications for which a priority claim is identified in the Application Data Sheet as filed with the present application are hereby incorporated by reference under 37 CFR 1.57.

BACKGROUND

In the field of computer science, blockchain technology enables one or more entities to manage and maintain an immutable ledger containing a growing list of records, called blocks, which are linked together using cryptography. Each block typically contains at least a cryptographic hash of the previous block, a timestamp, and transaction data. The timestamp proves that the transaction data existed when the block was published in order to get into its hash. As blocks each contain information about the block previous to it, they form a chain (where the full chained set of records from the point of inception for the particular distributed ledger is often referred to as "the blockchain" for the associated distributed ledger implementation), with each additional block reinforcing the ones before it. Therefore, blockchains are resistant to modification of their data because once recorded, the data in any given block cannot be altered retroactively without altering all subsequent blocks.

Blockchains are usually managed by a peer-to-peer network for use as a publicly distributed ledger, where nodes collectively adhere to a protocol to communicate and validate new blocks, such as protocols relying on either a given node's proof of work or proof of stake before a network of nodes (each containing copies of a given distributed ledger) participating in block validation will accept a new block proposed by the given node for inclusion as the next block in the blockchain. Before a new record or transaction, such as a transaction to transfer blockchain-tracked value between cryptographic addresses, can be added to a block to be included in the blockchain, the submitter of the transaction typically must provide a cryptographic signature using a private cryptographic key of the submitter. The validator nodes participating in validating additions to a distributed ledger or blockchain are typically configured to check that the signature for a new record submission or transaction submission is valid using a public cryptographic key associated with the purported submitter (such as a public key based on a cryptographic address of the submitter, sometimes referred to as a wallet address).

The term "non-fungible token" ("NFT") is frequently used to refer to a unique and non-interchangeable unit of data stored on a digital ledger or blockchain. The lack of interchangeability (fungibility) distinguishes NFTs from blockchain cryptocurrencies, such as Bitcoin (where, for example, wallet owners typically only care about the amount of a token/currency owned/received rather than a particular unique or numbered instance of that currency/token that can only be held by one owner at a time). NFTs are often used to represent media items such as photos, videos, audio, and other types of digital files as unique digital items. In other cases, a data object containing a unique set of properties (such as a set of attributes represented as attribute:value pairs) may be considered an NFT even if not associated with an image, video or other media item. In the case of NFTs representing a media file, the digital file containing the actual underlying image, video or other media of the NFT is typically not stored on the blockchain (such as due to cost and/or storage efficiency considerations, as costs to store data on the blockchain itself typically make it prohibitively expensive and technically inefficient to store the relatively large data size of an image of even moderate resolution), but instead identified by a uniform resource identifier ("URI") pointing to an off-chain storage location. Blockchain technology is used to establish a verified and public proof of ownership of the digital file, where the ownership can be transferred between cryptographic addresses using blockchain transaction techniques such as those briefly summarized above.

Typically, the blockchain record of ownership for a given NFT merely represents ownership of a particular digital file, but in the majority of cases does not represent ownership of the underlying copyright or other intellectual property in an image or other media that the NFT represents. For example, a potential NFT purchaser or other individual reviewing only the blockchain records themselves for ten identically-appearing digital images stored as NFTs on a blockchain would often have no way of conclusively determining which one of those NFTs, if any, were created and/or authorized by the person or entity holding copyright ownership of what is depicted in the image, nor would the individual be able to determine from the on-chain data whether purchase of a particular NFT would provide the individual as a new owner of the NFT with particular rights under copyright law, such as the right to create and/or sell copies or derivative works of the underlying media that the NFT represents or contains.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIGS. 1A and 1B are example user interfaces for enabling an owner of a first NFT to authorize a third party to create a derivative work of content associated with the first NFT, such as for minting as a second NFT stored on a blockchain.

FIGS. 1C and 1D are user interfaces that may be presented in association with minting of a new NFT on a blockchain with cryptographically provable approval of a rights holder in a base work on which content of the new NFT was based.

DETAILED DESCRIPTION

Figures 2A, 2B:
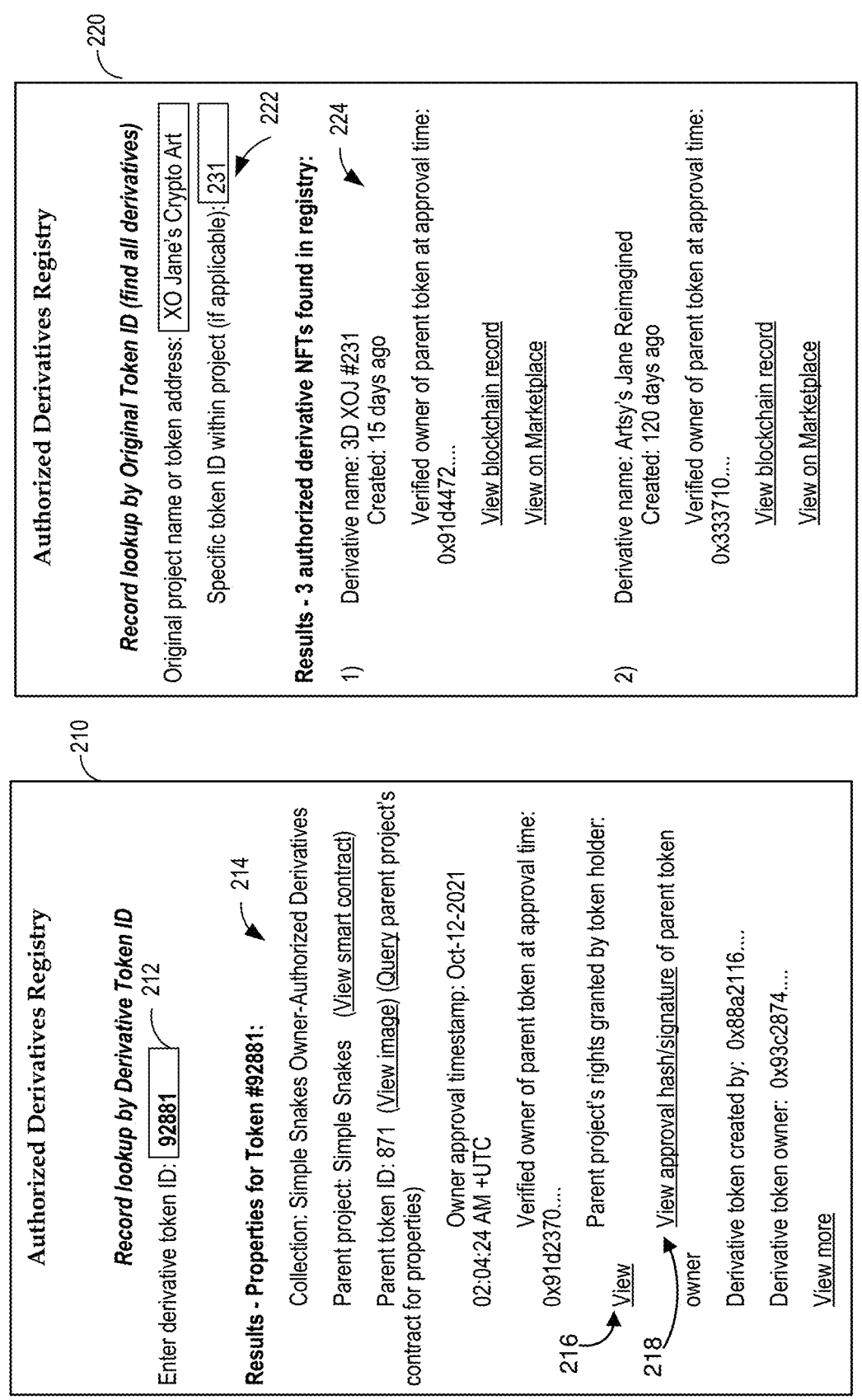
FIGS. 2A and 2B are illustrative user interfaces enabling a user to look up license information in blockchain records in association with one or more derivative work NFTs that were created based on a base NFT.

Generally described, aspects of the present disclosure relate to blockchain-based registration of copyright license status, usage rights, other intellectual property rights and/or other permissions associated with NFTs (non-fungible tokens stored on a blockchain) created as derivative works of (or otherwise created based in part on) a work or underlying NFT of a rights holder. For example, while the typical NFT creator does not grant significant copyright rights to a purchaser of the creator's NFTs, in some cases an artist or other NFT creator that sells or distributes 100 NFTs that each include a different copyrighted image or video (created by that NFT creator) may wish to authorize downstream owners (e.g., 100 different token purchasers) to create derivative works of the specific image/video represented in an NFT owned by that token holder.

Aspects described herein include a system for enabling an artist or other creator of an image, video or other media (or data of a 3D model or other content that may not be considered media specifically) who is authorized by a token holder of media and rights of a particular NFT to create an associated derivative work and to have an immutable record stored on a blockchain indicating that the media of a newly minted derivative work's on-chain token was authorized as a licensed derivative work by the blockchain/wallet address of the person who held the original token at the time of derivative work creation/minting. Potential future token purchasers may query a blockchain-based registry to see if a derivative NFT was made in an authorized/licensed manner or instead constitutes a potential copyright infringement of the associated base work.

As one example, consider a current owner of one token, NFT #50, for a particular project who is authorized by the project's creator and intellectual property ("IP") owner to create derivative works of the image represented in that NFT #50. For illustrative purposes, consider that NFT #50 includes an image depicting a distinct and easily recognizable character drawn by a popular artist. The project may include 99 (or 9,999 or some other amount) other images, each minted as a different NFT with potentially different token holders, of different characters drawn by the same popular artist. Consumers and potential NFT purchasers may be aware that the project allows owners of those individual NFTs to authorize the creation of new art (whether minted as a new NFT or otherwise) that is based on or inspired by the original NFT's art. However, according to the existing state of NFT systems and services, there is no mechanism or system for a potential NFT purchaser to determine whether a work that they see for sale in an NFT marketplace, which may clearly be a variation of one of the popular artist's original 100 character NFTs, was created with authorization of any kind from a rights holder or licensee of the original work's copyright rights. Aspects of the present disclosure address this problem and others by providing independently verifiable cryptographic proof of a proper chain of rights, licenses or permissions flowing between token holders and creators, which can be tied to the derivative work's NFT and/or be queried in separate records on a blockchain.

While the example of an NFT or non-fungible token is frequently used herein, it will be appreciated that the objects stored on a blockchain and frequently referenced as NFTs herein are not limited to objects that are necessarily entirely "non-fungible" or to objects that necessarily include any associated media (e.g., data intended to be presented as an images, video, audio or similar content). As one example, it is common for a collection of objects stored on a blockchain to be referenced as NFTs (implying that they are non-fungible) when in fact they may appear to a consumer of the associated media to be interchangeable or fungible with respect to some set of related objects (e.g., an NFT project that mints 100 identical images as NFTs that are each separately transferrable). As another example, it is known that the term NFT is sometimes used to refer to on-chain objects or entries that are merely a collection of properties or data (such as key-value pairs represented only as numbers or short text), without necessarily containing any field, attribute or property that represents or points to any media or other file.

While examples are provided herein for illustrative purposes, the terms "NFT" or "non-fungible token" as used herein are not intended to depart from their ordinary meaning in the field of blockchain technology, in which a strict definition of "non-fungible" is not always applied to the NFT term. For example, those of ordinary skill in the art of blockchain technology will recognize that at times the term NFT is used in common parlance in the field to refer to tokens of smart contracts that may not be entirely nonfungible in the strictest sense, such as tokens of a smart contract implementing the ERC-1155 standard on the Ethereum blockchain (where, for example, a single smart contract may include the use of both nonfungible and semi-fungible tokens that users may each consider to be NFTs in common usage of the term). It will further be appreciated that the difference between two NFTs of a given project or smart contract may be as minor as a token identifier in some instances (e.g., two different wallets owning numbered versions of the same digital photograph, where the token information of each points to the same image URL, but where one is identified in the blockchain data as token #1 and the other as token #2, similar to unique serial numbers utilized in a limited edition print run for traditional physical art prints).

As further discussed below, a rights holder may take advantage of features described herein by creating a record on a blockchain (such as using a minting service as described herein) to represent some underlying copyright or intellectual property ("IP") that the IP owner wishes to license to others as described herein, even if that IP is not native to the blockchain and the resulting blockchain record is not intended for transfer, display or other common uses of NFTs. A rights holder for many related works or material subject to copyright protection could create tokens for individual works that represent a base record from which the rights holder can use features described herein to authorize third parties' use or creation of associated derivative works based on that work, without the token actually containing or referencing media of the work itself. For example, an organization owning the distribution rights and copyrights associated with a professional sports league, eSports or mixed martial arts fighting league could create a token before, during or after an event that they promote that can be used according to features described herein to grant a future token holder the right to exercise one or more copyright rights or other licensed activity (such as display video, create media incorporating highlight clips, etc.) of a particular event, match, bout, etc. per terms of a particular license that is stored in an immutable way (e.g. on a blockchain).

Under copyright law, both in the U.S. and other countries, a copyright holder generally owns a bundle of rights. For example, under U.S. law, the copyright owner is generally (aside from fair use exceptions) the only one who has the right to: reproduce the work in copies; prepare derivative works based on the original work; distribute copies to the public; or display and perform the work publicly. The extent to which an artist or other NFT creator desires to grant limited or unlimited licenses to a purchaser or current owner of a particular NFT to one or more of these exclusive rights (those in the bundle of copyright rights) varies widely between NFT projects and creators. For example, one artist may not explicitly grant any particular rights under copyright laws to a purchaser of his art as an NFT (though some limited display rights or other rights may arguably be inferred depending on the situation), while another artist may explicitly provide written terms upon NFT purchase that the full bundle of copyright rights and commercial exploitation rights to the underlying image or other work are passed to whomever owns the NFT at any given time (and may explicitly allow such a token holder to grant licenses to create derivative works or otherwise exploit the work to other third parties).

It will be appreciated that as used herein, a derivative work may broadly reference a work that is at least partly based on (or creatively inspired by) and includes some noticeable elements of an original previously created work, though it may itself include significant original creativity by the creator of the derivative work. Thus, an NFT or other work described as derivative herein is not intended to be a pejorative term, or to imply that an original artist or copyright holder disapproves of the derivative. The term derivative work or derivate NFT as used herein is not necessarily limited to its meaning under copyright laws, or necessarily something that would legally require a copyright license from the base work's copyright holder. For example, the features discussed herein for granting approval to create, exploit or sell a derivative NFT may apply to a second NFT that contains a wholly transformative work or that would constitute fair use under copyright laws with respect to the first base work, but for which the original base work's rights holder and/or new work's creator desire to have explicit recorded approval or blessing in an immutable record.

As used herein, it will be appreciated by one of ordinary skill in the art of blockchain-based software development that a smart contract may generally refer to code stored on a blockchain that may be executed or interpreted by one or more blockchain nodes to cause some associated functionality to occur. As an example, it is known that smart contracts in association with the Ethereum blockchain can be in the form of low-level machine instructions (compiled from higher language code, such as Solidity code) stored on the distributed Ethereum blockchain that are capable of being executed by the Ethereum Virtual Machine ("EVM").

Example User Interactions and Interfaces

As will be described further below, a server and/or a smart contract executed on a blockchain node may interact over a network with a user, such as an individual with access to a private cryptographic key of a particular blockchain address. In some embodiments, a webpage or other user interface may present a request or selectable option for a user to provide a cryptographically signed message or otherwise send a cryptographic signature from the user's cryptocurrency wallet (such as via a locally executed software program or browser extension, such as the known MetaMask cryptocurrency wallet, installed on a web browser application on the user device) to code of the webpage. In one embodiment, this may be accomplished via execution of code of the webpage, such as Javascript (e.g., utilizing React.js, Web3.js and/or other libraries configured for interaction with cryptographic wallets and/or blockchains), that is executed by the user's browser or other local application upon user selection of a link, button or other selectable option presented on the webpage. In other embodiments, a user may utilize a custodial wallet by which a third party custodian service (or cloud service provider) maintains the user's private cryptographic key and signs blockchain transactions or messages on the user's behalf, in which case the webpage or other user interface presented to the user may be configured to communicate over a network with an application programming interface ("API") of the custodial wallet provider rather than with a local wallet application or local hardware wallet device. In that case, the user may be authenticated as the account holder by the custodial wallet provider (e.g., via an API) using a login and password, two-factor authentication, or other known techniques, and the signature described herein may be ultimately generated by the custodial wallet provider remotely from the user's device.

An initial message request or signature request to the user's locally executed wallet application may request approval (via a cryptographic signature request) to obtain the user's address (e.g., Ethereum address or public key) along with a signature that the wallet application generates using the user's private key (e.g., a private key for that user's address, where the private key is stored in an encrypted form on local memory accessible to the wallet application or on a dedicated hardware wallet device, such as Ledger or Trezor device, that is currently connected to the user's primary computer device). In the case of use of a dedicated hardware wallet by the user, it will be appreciated by one of ordinary skill in the art that existing functionality of a wallet application may be previously configured to interact with the user and the hardware wallet in order to prompt the user to approve generation of the signed message by the hardware wallet using the user's private key stored by the hardware wallet, where the generated signed message is then returned via local communication (e.g., via function or API calls communicated over a USB connection or similar) to the wallet application and in turn to the webpage's code.

In some embodiments, once the code of the webpage receives the signed message back, the webpage code may locally (or through an API call or other communication with a server) authenticate or validate the signature using the user's public key (e.g., the public blockchain address provided from the wallet application), to ensure that the user must be in possession of the corresponding private key and therefore is considered to properly control or have access to the given wallet or address. It will be appreciated that at this point no interaction with the public blockchain or nodes of the blockchain is necessary for address authentication, although the code of the webpage may optionally retrieve data from the blockchain that is associated with the given public address (e.g., may identify tokens, cryptocurrency or other assets or balances for the address to display to the user or to trigger further interactions, as further discussed elsewhere herein).

In some embodiments, once a user is authenticated as being in control of a particular wallet or cryptographic address (e.g., the user has proven capable of signing transactions to move cryptocurrency or tokens owned by the given blockchain address that will be accepted by nodes of the blockchain as valid signed transactions to be executed), one or more user interfaces and/or message requests may be generated, as will be further described below. For example, a user may be presented with options for authorizing a derivative NFT, creating a derivative NFT and/or other features described herein. In some embodiments, code of the webpage or user interface may query a smart contract or server for any outstanding requests associated with the given wallet address or user, such as any outstanding requests from a potential derivative creator for derivative minting approval and/or requests from a base token holder to create a derivative work. Code of the webpage or user interface may further query one or more public blockchains for NFTs owned by the given wallet address and that may be eligible for initiating a derivative approval process described herein. These and other user interfaces and associated features will now be described with respect to specific examples.

FIGS. 1A and 1B are example user interfaces 110 and 120 for enabling an owner of a first NFT to authorize a third party to create a derivative work of content associated with the first NFT, such as for minting as a second NFT stored on a blockchain. These user interfaces may be presented on a client device or user device, but may be generated by or include content or data received over a network from a server or other remote system. For example, the user interfaces may have been generated at least in part by a license registry service 340 (described further below) and sent over the Internet or other network to an NFT owner device for display and interaction. The user interfaces may be presented in a browser program as a webpage, or may be presented as a user interface within a proprietary program (such as a mobile application maintained by a license registry service, wallet provider, NFT marketplace or other entity).

As shown in user interface 110 of FIG. 1A, a user may be presented with identifying information of two NFTs, presented by name and their underlying images 112 and 114. In some embodiments, these NFTs may have been determined by code of the page to be owned by the user of the device (shown as an account named "John123" and a blockchain or wallet address shown on the page in a truncated partial form as "0x453 ... 8891"), as discussed above. In some embodiments, these specific NFTs displayed may be only a partial subset of the total NFTs owned by the user's blockchain address, which may have been filtered for display by code of the page and/or by the license registry service to only include NFTs associated with creator addresses, projects, tokens and/or creators that the registry service can verify provide rights or license terms to NFT owners for such owners to authorize at least some downstream licenses/sublicenses to other parties.

For example, the license registry service may provide user interfaces and/or APIs through which NFT project creators can register their NFT projects and/or associated NFT-minting smart contracts with the registry service, along with license and ownership terms that the creator or project is granting to its NFT purchasers (e.g., as enumerated or Boolean values for various license-related properties/attributes such as "Authorize derivative works?", "Use commercially?", "Make physical copies?", "Display on social network profile?", etc.). In other embodiments, the license terms for a particular NFT project may be codified or stored in a computer-interpretable manner by the license service via an administrative user (such as an attorney) reading a human-readable license agreement or terms of service document published by the project creator (such as posted to the project's website) and creating a data object or record on a blockchain or a data store accessible to the license registry service regarding the project's license grants to NFT holders. As a project's team may change the license or IP ownership terms for a project over time, modified terms may be stored as new entries (rather than overwrites) along with a timestamp, such that it can be determined in the future which license version was in force as of the timestamp of any particular derivative NFT's minting or creation.

The user viewing user interface 110 may select one of NFTs 112 or 114 to initiate approval by that user of a third party's use or derivative creation with respect to that token's content. Selection by the user of their owned NFT 112 in user interface 110 may result in the display of user interface 120 of FIG. 1B. As shown in user interface 120, the license terms of NFT 112, as granted to the user (as a "Simple Snakes" token holder), by the creator of the "Simple Snakes" NFT project include allowing the token holder full commercial use rights and assignable derivative work creation rights with respect to the underlying image or art of NFT 112. The user may upload a file of new derivative art (e.g., an image or video file) that the user has already created or obtained (and which the user wishes to mint as a new NFT), or may approve someone else to create a new derivative NFT based on NFT 112. In the illustrated example, the user has started filling in fields of the user interface 120 to initiate grant of approval to a third party associated with the account "TylerD" (which may be mapped to a blockchain address by the license registry or a third party name registration service) to create a new derivative work.

The user can enter the number of NFTs that the user is authorizing the third party to create, which blockchain platform or blockchain network the new NFT should be minted on (e.g., Ethereum, Solana, Polygon, etc.), any limitations on the creator (legally or creatively, such as not disparaging the original work, not introducing any third party recognizable IP or branding, specific authorized media type, whether a still image or animated/video, etc.), whether or not the user wants to view content of the derivative work before it is finally approved for minting as a new NFT, whether payment (such as cryptocurrency payment automatically initiated by a smart contract to or from the licensing user, project creator, and/or derivative creator) should occur prior to or upon NFT minting, and a wallet address that should initially own the derivative NFT(s) (such as the user's own wallet, the creator's wallet, a smart contract address for sales/auctioning of the new NFT, etc.). It will be appreciated that more or less fields or options can be provided in other embodiments. Once the user has entered the desired information, the user may select "sign approval" option 124 to be presented, by code of the page or user interface, with a request to cryptographically sign a message containing or representing the various approval options set in the user interface, such as discussed above with respect to interacting with a software wallet or custodial wallet.

FIGS. 1C and 1D are user interfaces 130 and 140 that may be presented in association with minting of a new NFT on a blockchain with cryptographically provable approval of a rights holder in a base work on which content of the new NFT was based. FIG. 1C may be presented, for example, to the artist or other creator, "TylerD", who the user in user interface 120 approved to create a derivative work based on NFT 112. User TylerD (as confirmed via wallet authentication techniques described above) may select in the user interface 130 various options 132 for providing information or files that will be used by the license registry service, a minting service, and/or a smart contract to create an NFT and/or register license status of an NFT representing or containing derivative content based on NFT 112. This may include the user providing a direct upload of media containing the derivative work (e.g., an image or video that the artist created in image editing software or photographed) or providing URI or other identifier information of media previously stored to a public location or distributed file storage system (such as InterPlanetary File System, or IPFS).

Various metadata properties (such as data indicating human-readable traits or descriptions of the content shown in the media file) may be provided by TylerD, such as in the form of a JSON file. The user TylerD may then select option 136 to send the NFT content to the original token holder for final approval. In other embodiments, an option may be provided in user interface 130 for immediately causing minting to begin for the derivative NFT, such as where the token holder did no indicate that the token holder wanted to approve the actual content of the media prior to NFT minting. As is known in the art, minting an NFT may refer to sending a transaction to the blockchain or a smart contract to initiate creation and storage of a new token on the blockchain, such as a token under the known ERC-721 standard for Ethereum-based NFTs. In other embodiments, the derivative NFT may already be minted, and a user interface similar to user interface 130 may request a unique identifier or location for the minted token in order to create a new registry record memorializing the license/approval status of the derivative NFT by the holder of the base work's NFT.

FIG. 1D illustrates an example user interface 140 that may be presented to the holder of NFT 112 after a derivative creator created a new work 114 (in this case, an image) and associated metadata 142 for which the original NFT owner is being asked to approve for minting as a derivative NFT. The user may select option 144 to view rarity among the derivative artist's collection (e.g., to see how common or rare the traits shown in 142 are among other NFTs created by the same artist). If the user approves of the new work, the user may select "approve for minting" option 146, which may cause the user's device to prompt for message or transaction signature using the user's private key, and then cause the device to send the signed message or transaction to a smart contract on the blockchain that will mint the derivative token and/or create a new registry record on the same or different blockchain than the derivative NFT.

FIGS. 2A and 2B are illustrative user interfaces 210 and 220 enabling a user to look up license information in blockchain records in association with one or more derivative work NFTs that were created based on a base NFT. In some embodiments, the information shown may be retrieved from one or more blockchains by a client device, smart contract, server, or cloud-based service. It will be appreciated that in some embodiments the license status information and approval information may be retrieved from blockchain blocks separate from those storing the record of the actual NFTs, while in other embodiments the license information and derivative approval status information may be stored within the same blockchain record as the original NFT and/or derivative NFT itself.

As shown in user interface 210, a user may enter a derivative token identifier 212 to view (as retrieved from a blockchain) a list of properties related to that derivative token, including the parent token ID (e.g., the identifier of the base NFT of which the derivative token is a derivative work), approval timestamp from the base token owner, rights granted to the original token holder by the original project's creator (option 216), the approval hash or signature of the parent token owner (option 218), etc. Record lookup of a derivative token may be desired, for example, by a potential purchaser of the derivative token on a marketplace, such as for the potential purchaser to confirm that the derivative token is in fact licensed as opposed to a copyright infringement or unauthorized copy or variation of the base work.

As shown in user interface 220, a user may enter an original token identifier (such as by project name, or the project's smart contract address, and associated token number within that project) to view a list of derivative NFTs or other works that have been authorized by one or more current or past owners of the original token. In the illustrated example, three derivative NFTs (summarized in section 224) have been properly authorized and had associated approval/license registry data stored on a blockchain. A record lookup of all licensed derivatives for an entered base NFT may be desired, for example, by a potential purchaser of the base NFT, a rights holder in the original project or base NFT, or a potential creator of a potential new derivative of the base NFT. For example, a potential purchaser of a base NFT may want to know if NFTs that he or she considers undesirable have already been minted and potentially resold to others. An original project creator may have come across what appears to be a copyright infringement of their original work, but may consult the derivative registry service to determine whether current or past token holders of the base token authorized derivative works such as the work thought to be a potential infringement.

In some embodiments, lookup features such as those shown in user interfaces 210 and 220 may be provided via an API (such as an API of the registry service) or direct blockchain interaction by an NFT marketplace or NFT wallet application. In some embodiments, the marketplace or wallet may be configured to display some or all of this data to users browsing NFTs for potential purchase or that are in the user's NFT portfolio/profile, and may display a graphical icon (such as a checkmark icon or similar) in association with display of derivative NFTs or derivative collections of NFTs that have appropriate license terms as memorialized on the blockchain. In some embodiments, this graphical icon indicating approval or license status of the derivative may graphically convey or signal to the user which specific parent project the license or approval derives from.

For example, if there is a well known NFT project consisting of images of cartoon monkeys, and a particular derivative NFT was approved to create a derivative NFT based on one of that project's NFTs, a marketplace or wallet may be configured (through direct review of the blockchain record or via an API of the registry service) to display a monkey logo or other identifier of that source project in association with display of the derivative NFT's image in order to visually indicate the licensed nature of the derivative NFT. Accordingly, a mapping may be stored between such approval icons and associated project identifiers in order to retrieve the appropriate approval icon for display in association with a derivative NFT.

Illustrative Operating Environment and Data Flows

Figure 3:
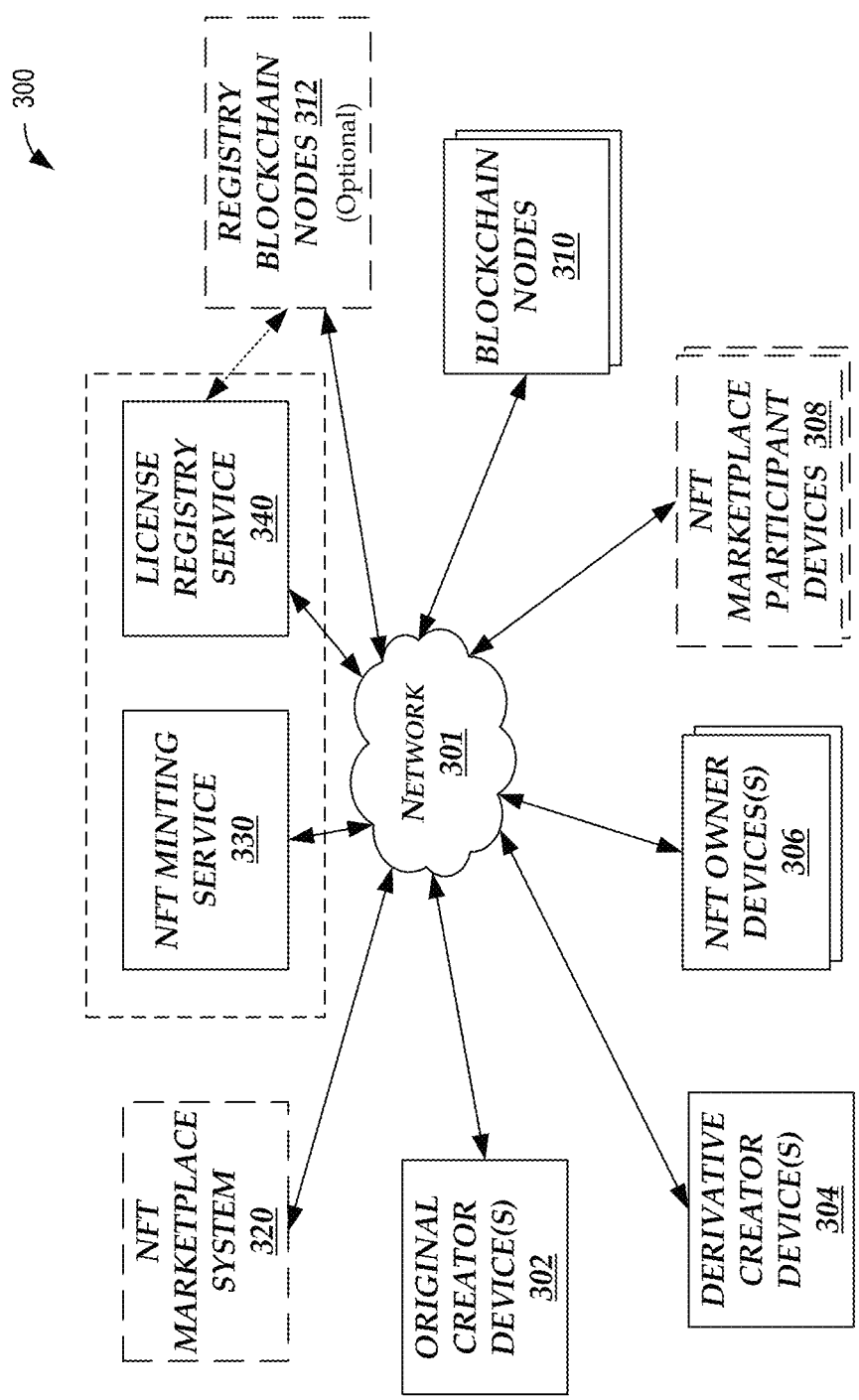
FIG. 3 illustrates an example operating environment, according to some embodiments of the present disclosure.

FIG. 3 illustrates an example operating environment 300, according to some embodiments of the present disclosure. The various systems, devices and/or services may communicate via a network 301, such as the Internet. Dashed lines may indicate components that are not present in some embodiments. In some embodiments, the NFT minting service 330 and license registry service 340 may be operated by the same entity as each other and/or be a single service or system. The registry blockchain 312 may not be present in some embodiments, for example, because the registry information may be stored in the same blockchain nodes 310 as the underlying NFTs, and/or may be stored in the NFT records themselves. The optional NFT marketplace system 320 may be operated by a third party and may provide features known in existing NFT marketplace systems, such as those offered by Rarible or OpenSea, as well as indications of whether particular derivative NFTs or projects have proper license approval as discussed herein (e.g., via communication with an API of the license registry service 340 and/or querying blockchain nodes 310 and/or 312).

In the illustrated embodiment of FIG. 3, the original creator device(s) 302, derivative creator device(s) 304, NFT owner device(s) 306 and NFT marketplace participant devices 308 may each be, for example, desktop computers, laptop computers, mobile devices (such as a smartphone or tablet computer), or other computing systems. Each of these devices may, in some embodiments, be used by respective users who have established a blockchain address and are involved in creating, minting, purchasing, collecting, trading and/or performing other actions with respect to blockchain tokens or NFTs, depending on the embodiment and the particular role of the particular user or user device in the methods described herein.

Figure 4A:
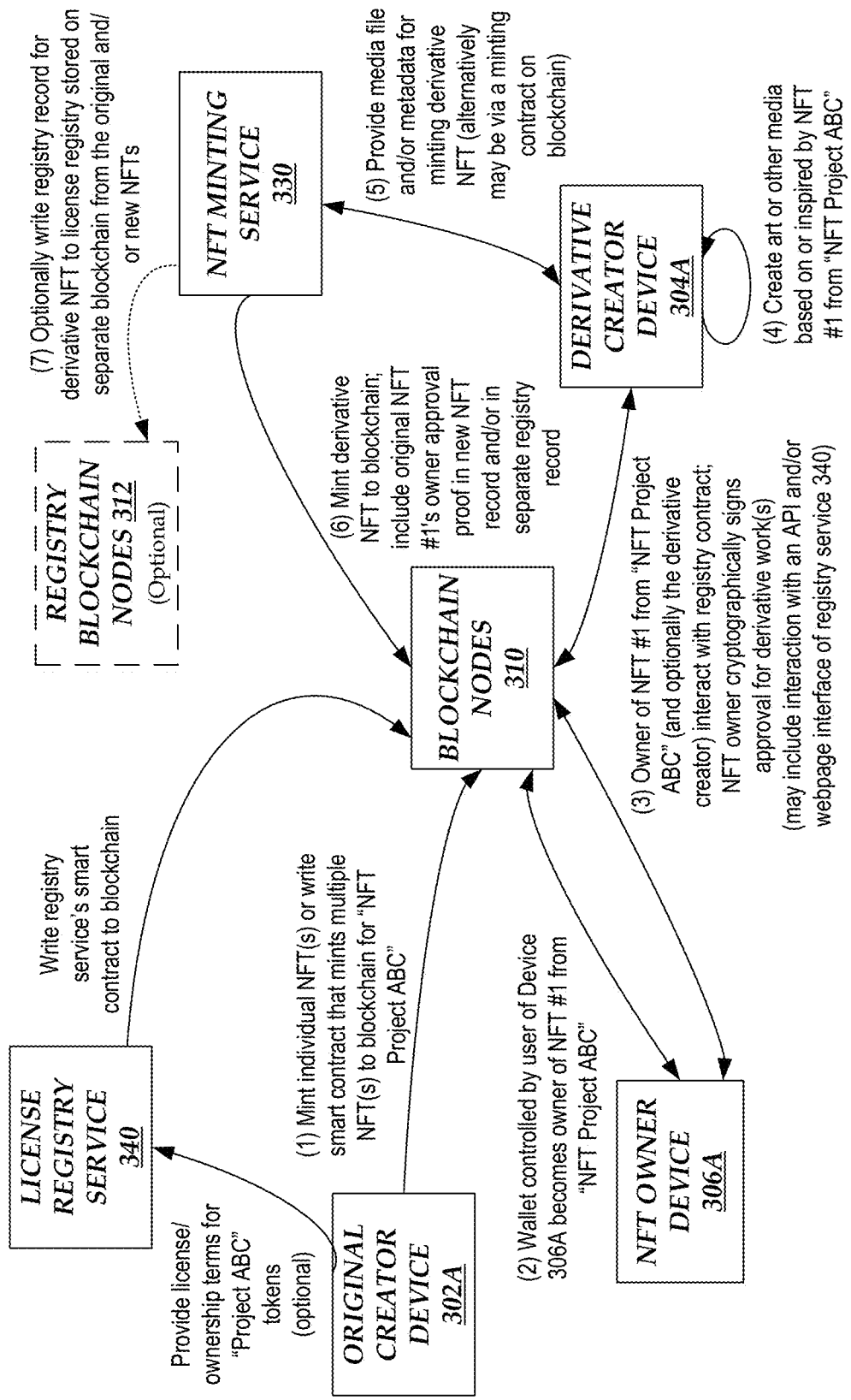
FIG. 4A depicts an illustrative data flow for minting a derivative NFT on a blockchain, according to some embodiments.

FIG. 4A depicts an illustrative data flow for minting a derivative NFT on a blockchain, according to some embodiments. As illustrated, the license registry service 340, or an operator of the license registry service 340, may cause a smart contract associated with the license registry service 340 to be written to a blockchain maintained by blockchain nodes 310. In some embodiments, the blockchain may be a general public blockchain, such as the Ethereum blockchain. The smart contact(s) may be configured, when executed by a blockchain node (such as using the EVM), to provide various functionality as described herein.

In some embodiments, a NFT project's creator or organization using original creator device 302A may provide the license terms and/or ownership terms that apply to their tokens to the license registry service 340, which may result in the license registry service 340 incorporating reference to these rules or terms in the smart contract, in a data store usable by an oracle that is called from the smart contract for the contract to obtain the terms for a particular project later on, or in a separate blockchain record.

At (1) in FIG. 4A, the original creator device 302A may cause one or more NFTs (identified as NFTs of a project "Project ABC" in this example) to be stored on the blockchain, such as through any known NFT minting process (e.g., the process may include a smart contract created by the NFT creator interacting with individual purchasers' wallets to charge a certain amount of cryptocurrency in order for a new NFT of the project to be minted to the purchaser's wallet). At (2), the user of NFT owner device 306A may purchase, or their wallet address may otherwise receive, ownership of a particular NFT from the project (in this example, token #1 from the project), which may occur in any known manner (e.g., directly from an NFT minting contract, via an on-chain transaction from one NFT holder to a new owner address, via a purchase on an NFT marketplace, etc.). In some embodiments, the original token creation and/or transfer steps (1) and (2) may occur before the creator provides ownership terms to the license registry service (if they ever do) and potentially before the license registry service may even exist (e.g., the original project could predate any derivative registration methods described herein).

At steps (3) and (4), the NFT owner device 306A and derivative creator device 304A may interact with the smart contract of the license registry service 340 (as stored and accessible on the blockchain of blockchain nodes 310) and/or with webpages sent from the license registry service 340 in order to obtain/grant approval for a certain derivative NFT, as previously discussed above (e.g., with respect to the example user interfaces described above). It will be appreciated that steps (3) and (4) could be performed in different order. For example, the original token's owner may initiate the approval grant process or the derivative creator may initiate the approval grant process, as described above.

It will be appreciated that the goal or purpose of step (3) according to some embodiments may be that the person or entity who controls (such as by knowing or having access to the private key, or login credentials in a custodial wallet environment) the wallet holding the particular NFT #1 token from "NFT Project ABC" indicates approval for the derivative work(s), which does not necessarily always need to be a signature from that same wallet in every embodiment. For example, it is known in the art of blockchain development that a smart contract or off-chain service can be configured to establish proxy signatures/approvals whereby an association is established between different wallets controlled by the same person, such that the given person can then cryptographically sign or approve certain limited actions or activities that require the person's ownership of a token that is owned by one of his or her other wallets by signing using the associated wallet as a proxy (where these approved actions would not typically extend to transfer of tokens).

Such existing proxy setups may include a proxy service or smart contract initially receiving a signature from a first wallet that indicates that the owner of that first wallet would like the proxy service/contract to allow a designated second wallet to be allowed to approve certain types of actions in the future that relate to one or more tokens in the first wallet (e.g., enabling a relatively less secure wallet, such as a wallet for which an individual has set up a mobile phone to generate signatures for, to be used at a concert event to prove an event attendee's wallet ownership of another wallet that holds an NFT that the event promoters have indicated allows the owner admission to the event).

Accordingly, in some embodiments that allow a user to utilize a proxy wallet, a user at step (3) of FIG. 4A could cryptographically sign using a first "hot" wallet (e.g., a wallet or address where the private keys are stored locally in the user's computer or mobile phone, but in which the user has decided not to hold cryptocurrency or NFTs of substantial value in case that wallet is compromised) rather than using a more secure "cold" wallet that actually holds the NFT #1 token from "NFT Project ABC" (e.g., a hardware wallet for which the person desires to limit the instances in which he or she transfers cryptocurrency or NFTs, and/or limit the smart contracts, distributed applications, websites, or other services for which the person is willing to provide a cryptographic signature from that particular wallet). Thus, in such instances and embodiments, step (3) may include a smart contract or off-chain service checking that the approval signature is consistent with a proxy wallet's public key or address (such as by retrieving a previously stored association or mapping, either locally or via a third party proxy wallet service or associated smart contract, that associates the wallet that owns NFT #1 with the signing proxy wallet), rather than exclusively checking that the signature is consistent with the wallet actually owning NFT #1.

At step (5), a media file (e.g., an image, video, sound file, 3D object data, etc.), though not required in the case of NFTs that are merely a data object or text-based, may be sent from the derivative creator device 304A, along with associated metadata (such as a JSON file, as discussed above) to the NFT minting service 330 for the derivative NFT to be minted at (6). In other embodiments the media identifier (e.g., an IPFS identifier) and metadata may be provided directly from the derivative creator device to the blockchain nodes or an associated on-chain smart contract for minting. The data memorializing and proving the license approval status from the original token creator may be included within fields or attributes of the minted NFT record itself on the blockchain nodes 310 and/or may be added in a new record on a blockchain maintained by registry blockchain nodes 312. For example, the license registry records for all NFTs across a number of different blockchains (e.g., Ethereum, Solana, etc.) could be recorded in a single blockchain (whether one of those same NFT-containing blockchains or an entirely different blockchain), with each record uniquely identifying the source blockchain and specific token identification information for each NFT referenced in the particular registry record (e.g., both the original NFT and the derivative NFT, which may be on different blockchains than each other and/or than the license registry record).

In some embodiments, the minted derivative NFT record stored on the blockchain associated with blockchain nodes 310 and/or the license registry record stored on the blockchain maintained in association with the registry blockchain nodes 312 may include independently verifiable cryptographic proof that the NFT owner of the original NFT granted approval for the specific derivative NFT to be made, sold, or for some other licensed activity identified in the record to occur. This cryptographic proof or evidence may be in the form of a cryptographic signature or similar data generated by the original NFT owner's wallet software (or a custodial wallet provider authorized by the NFT owner) that was passed directly or indirectly from the NFT owner device 306A to the system, node, contract or entity (e.g., a smart contract of the license registry 340, as executed by a virtual machine resident on the blockchain nodes 310) that mints the derivative NFT and/or that creates the separate license registry record for the derivative NFT.

As described previously, the cryptographic signature from the NFT owner device 306A may be a signature created by the cryptocurrency wallet software (e.g., MetaMask, as one example) and/or hardware wallet of the user, using the user's private key, when the user selected to sign a message that was presented to the user via existing wallet software and/or hardware. The message may be generated at least in part by code provided from the license registry service 340 (such as via Javascript of a webpage sent from the license registry service 340 to the NFT owner device 306A). In some embodiments, the message and message signature request may be formatted in a manner such as those described in the Ethereum Improvement Proposal 712 ("EIP-712", titled "Ethereum typed structured data hashing and signing"). For example, methods described in EIP-712 provide for off-chain signing of a message containing structured data that is compatible with smart contracts (such as contracts written in Solidity) and subsequent on-chain use.

In some embodiments, a JSON object or similar object may be generated by the license registry service or code of the webpage sent from the license registry service to the NFT owner device 306. This object or data structure may include properties such as those described with respect to FIG. 1B above (the user example user interface that includes the "sign approval" option 124), such as identification information for the base token, the base token's project, the number of new NFTs allowed for creation, the permitted derivative creator's wallet address and/or user name, and/or other data. Wallet software interacting with the license registry service or associated webpage may present data from this object (e.g., with a user interface notification that the user's signature is being requested on a message from the license registry service, with a certain smart contract identifier, with the message object containing the specific data detailed in the JSON or similar file or data structure). Alternatively, a message hash representing the object or other data of the message may be presented by the wallet software.

After the user causes the wallet software to generate the cryptographic signature of the message with the user's private key for the blockchain address holding the original NFT, this object data and signature may be passed to the smart contract of the license registry service as described herein and included in a blockchain record of the new NFT or in a separate registry record. Any subsequent reviewer of the blockchain record would be able to independently confirm that the stored signature is consistent with the public key or address of the original NFT owner and that the metadata regarding the license approval matches the signed object, which can be confirmed to have not been tampered with or changed since signing.

Figure 4B:
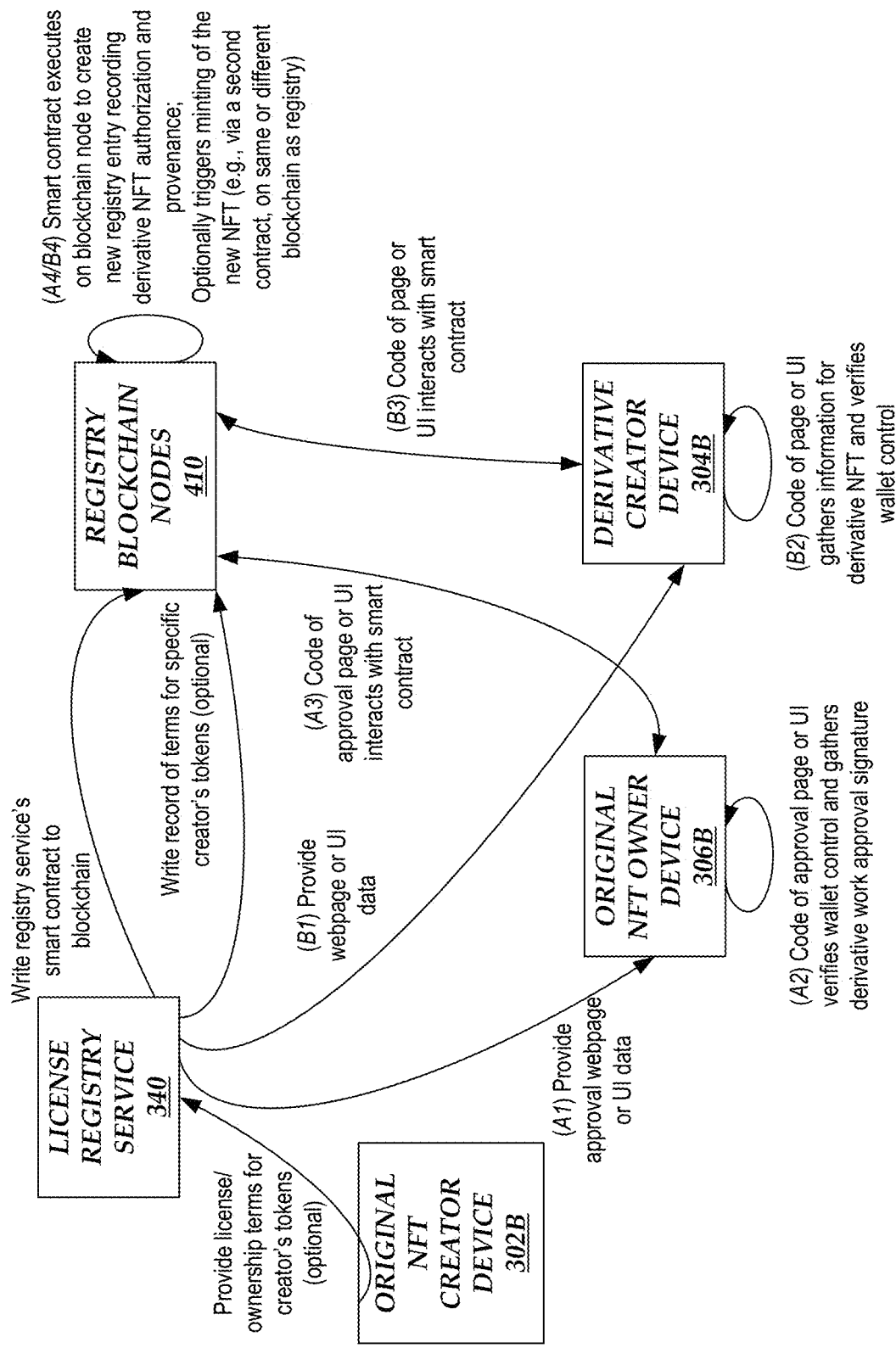
FIG. 4B depicts an illustrative data flow for executing an on-chain smart contract for creating an entry in a blockchain-based registry memorializing a rights holder's approval of a derivative NFT, according to some embodiments.

FIG. 4B depicts an illustrative data flow for executing an on-chain smart contract for creating an entry in a blockchain-based registry memorializing a rights holder's approval of a derivative NFT, according to some embodiments. Unlike that data flow shown in FIG. 4A, the data flow shown in FIG. 4B may not include minting or writing the actual derivative NFT itself to a blockchain, and the derivative NFT could exist on a blockchain prior to the approval of the original NFT owner. This embodiment may be useful, for example, where a derivative creator had previously minted an NFT after receiving approval from an original NFT holder or other rights holder in the original work separate from the registry approval process described herein (e.g., the derivative creator may have obtained written approval in email communication with the original work's rights holder rather than any cryptographically signed approval described herein), but wishes for the approved status of the already-created derivative NFT to be formally reflected in blockchain records with appropriate cryptographic signature from the rights holder or licensee for the original base work on which the derivative is based.

The individual steps of FIG. 4B summarized in the figure have for the most part been described in more detail above. The steps (A1), (A2) and (A3) could occur before or after steps (B1), (B2) and (B3), as discussed above with respect to similar steps of FIG. 4A, though in either case both (A3) and (B3) would occur prior to the step labelled (A4/B4) in the illustrated embodiment.

Features in Some Embodiments

Below are optional features or functionality that may be implemented in some embodiments of the present disclosure.

In one embodiment, on-chain data identifying a rights holder's approval of a derivative work may be stored within the blockchain record comprising the derivative work's NFT itself, or in a separate blockchain record/entry that identifies the derivative work's NFT data or location. For example, the original NFT could be stored on one blockchain (such as Ethereum), a derivative of that NFT stored on a second blockchain (such as Solana), and the registry record identifying both of those tokens and memorializing the cryptographically signed approval for the derivative's creation/minting on a third blockchain (such as Polygon).

In another embodiment, functionality for minting a derivative NFT and/or for creating the license/approval registry information may be entirely within one or more smart contracts, implemented by a central server, implemented by code executing on a client device, or a mix of these approaches, depending on the embodiment. For example, certain functionality may be implemented via smart contract on a blockchain with relatively low transaction costs (e.g., "gas" fees) but shifted in part to server-side functionality in other cases. In some embodiments, the registry smart contract may be written to multiple blockchains in order to operate on various blockchains where an artist or other creator may desire to mint a derivative work as a new NFT.

In another embodiment, the registry service may maintain a smart contract or an oracle that is callable from third party smart contracts for those contracts to confirm that a token is a licensed derivative from a base project and/or to retrieve various associated metadata as described herein.

While the example is often provided above of an individual NFT owner granting rights or licenses, it could alternatively be the original artist or creator of the underlying work (such as a project creator minting 1000+ tokens of generative art via a smart contract) who directly grants rights to downstream derivative creators. Accordingly, in such instances, the source of approval (e.g., via a cryptographic signature) for derivatives could need to come from that creator or the project's representative rather than through individual owners of the minted tokens.

In some embodiments, the token holder of an original work may select from options of allowed usage, such as approving a specific image file or created NFT as authorized/licensed by the token holder, or allowing a specific creator (e.g. by wallet address) to create up to X amount of derivative work tokens without the token holder specifically approving each NFT after image creation. For example, a token holder could authorize a specific smart contract (e.g., by providing the contract address) to create a certain number of derivative work tokens, such as a contract that takes in an image from the base token and algorithmically creates a derivative image or video (e.g., using a generative adversarial network, generative art techniques, and/or others).

In some embodiments, the license registry service may perform automated checks of derivative media, prior to minting as an NFT, to determine if known copyrightable material of third parties is present in a derivative NFT (e.g., automated checks with access to large databases of copyrighted works), or machine learning models that check for certain known characters as objects (e.g., Mickey Mouse or similar iconic characters, logos, etc. that may cause license concerns apart from the underlying NFT owner's license approval) or manual review. If issues are found, messages may be presented to an administrative user of the system, to the underlying NFT owner, and/or to the derivative creator explaining that the license registry will not approve the particular derivative work for "authorized" status absent additional third-party rights holder approval.

In some embodiments in which the registry service mints the derivative NFT, the derivative work as minted as an NFT may include within the media of the NFT (such as an image or video file), a watermark, QR code or other indicator detectable from the pixel data and generated by the registry service that indicates the approval source (e.g., associated base NFT) or a hash or other identifier of the associated on-chain registry information.

In some embodiments, a user interface may be generated from the on-chain records and/or license records otherwise maintained by the license registry service that depict the full chain of rights/licenses/sublicenses from an original creator to a certain derivative work. For example, the chain of ownership may indicate that copyright rights were granted from an artist to an NFT project, from the NFT project to a first purchaser of a token, from the first purchaser of the token to a secondary purchaser (e.g., as occurring upon NFT sale on an NFT marketplace), then from the secondary purchaser of the base NFT to a certain derivative artist via derivative approval functionality described herein.

According to some embodiments, a rights holder for a number of different works could create tokens for individual works that represent (or serve as a base from which to authorize) a derivative creation right for that work, without the token actually containing or referencing media like an image or video. For example, a movie production company, professional sports organization or other media-producing entity could create a token before, during or after an event or production occurs that represents or grants a holder of that token the right to create or authorize derivative works per terms of a particular license stored in an immutable way (e.g., on a blockchain). In some embodiments, the tokens may be kept by the original rights holder themselves (e.g., by the movie company) to serve as an on-chain record from which the rights holder can authorize downstream licenses to other parties according to features described herein.

In some embodiments, because a derivative registry record or newly minted derivative NFT as described herein includes data effectively indicating a link between a base NFT and an associated later-generated NFT, these features may be useful for users to identify NFTs that are usable in connection with a base NFT or that were designed with the base NFT in mind, even if those NFTs are not necessarily derivative works. For example, if a certain base NFT represents character data that defines a character that can be used across a number of different computer games (e.g., defines traits of a wizard character, such as a unique name, and values for attributes such as strength, weapon type, stamina, etc.), methods described herein can be used to create on-chain associations between the base NFT and other NFTs such as virtual clothing for that character, pixel art depicting the character, a 3D model depicting the character, a companion animal character for the character, etc. Accordingly, a creator or smart contract could be authorized as described herein by the base project lead (e.g., a designer of the wizard characters) and/or by a particular NFT owner (e.g., owner of wizard #10) to create such complementary or extension items for the base NFT(s) that would then be linked or associated with the appropriate base NFT via one or more blockchain records as described herein. The approval processes and features described herein may be desirable to the base project and the base NFT owners in such cases for at least the reason that there is a clear on-chain record of such approved later-created items versus unapproved items (such as virtual clothing that would be deemed inappropriate, controversial, of poor quality, an in-game security risk, infringing of third party IP rights, etc.).

Example Computing System

Figure 5:
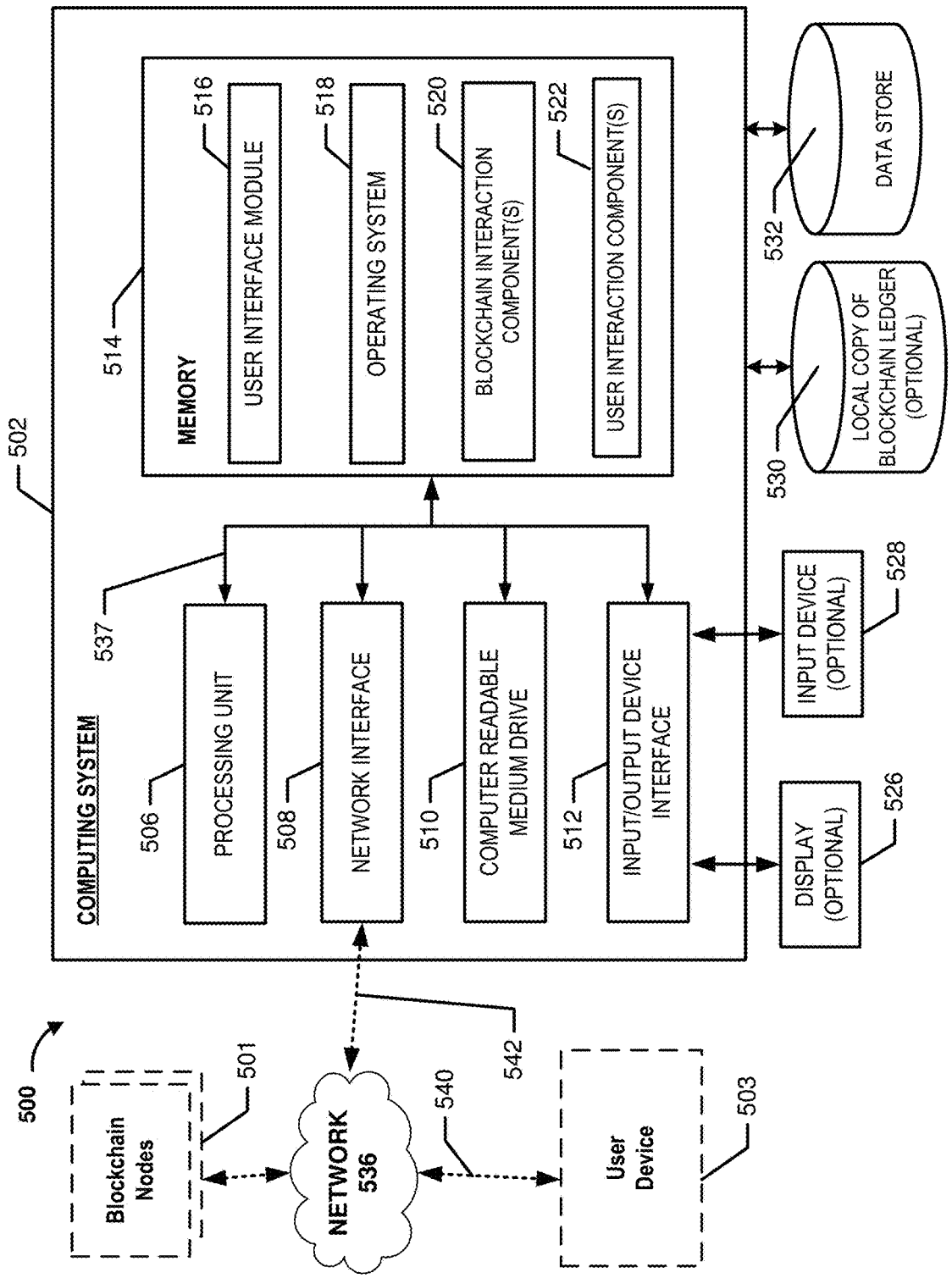
FIG. 5 is a block diagram depicting an illustrative architecture for a computing system that may implement one or more of the features described herein.

FIG. 5 illustrates a general architecture of a computing environment 500, according to some embodiments. As depicted in FIG. 5, the computing environment 500 may include a computing system 502. The general architecture of the computing system 502 may include an arrangement of computer hardware and software components used to implement aspects of the present disclosure. The computing system 502 may include many more (or fewer) elements than those shown in FIG. 5. Depending on the embodiment, one or more components illustrated within computing system 502 may be utilized to operate the NFT minting service 330, the license registry service 340, an individual blockchain node, an NFT creator's device or an NFT owner's device.

As illustrated, the computing system 502 includes a processing unit 506, a network interface 508, a computer readable medium drive 510, an input/output device interface 512, an optional display 526, and an optional input device 528, all of which may communicate with one another by way of a communication bus 537. The processing unit 506 may communicate to and from memory 514 and may provide output information for the optional display 526 via the input/output device interface 512. The input/output device interface 512 may also accept input from the optional input device 528, such as a keyboard, mouse, digital pen, microphone, touch screen, gesture recognition system, voice recognition system, or other input device known in the art.

The memory 514 may contain computer program instructions (grouped as modules or components in some embodiments) that the processing unit 506 may execute in order to implement one or more embodiments described herein. The memory 514 may generally include RAM, ROM and/or other persistent, auxiliary or non-transitory computer-readable media. The memory 514 may store an operating system 518 that provides computer program instructions for use by the processing unit 506 in the general administration and operation of the computing system 502. The memory 514 may further include computer program instructions and other information for implementing aspects of the present disclosure. For example, in one embodiment, the memory 514 may include a user interface module 516 that generates user interfaces (and/or instructions therefor) for display upon a computing system, e.g., via a navigation interface such as a browser or application installed on the user device 503.

In some embodiments, the memory 514 may include one or more blockchain interaction components 520 and user interaction components 522, which may be executed by the processing unit 506 to perform operations according to various embodiments described herein. The modules or components 520 and/or 522 may access the data stores 530 and 532 in order to retrieve data described above and/or store data. The data stores 530 and/or 532 may be part of the computing system 502, remote from the computing system 502, and/or may be a network-based service.

In some embodiments, the network interface 508 may provide connectivity to one or more networks or computing systems, and the processing unit 506 may receive information and instructions from other computing systems or services via one or more networks. In the example illustrated in FIG. 5, the network interface 508 may be in communication with a user device 503 via the network 536, such as the Internet. In particular, the computing system 502 may establish a communication link 542 with a network 536 (e.g., using known protocols) in order to send communications to the computing device 503 over the network 536. Similarly, the computing device 503 may send communications to the computing system 502 over the network 536 via a wired or wireless communication link 540. In some embodiments, the computing system 502 may additionally communicate via the network 536 with one or more blockchain nodes 501, such as to write or read data from a public or private blockchain.

Those skilled in the art will recognize that the computing system 502 and user device 503 may be any of a number of computing systems or devices including, but not limited to, a laptop, a personal computer, a personal digital assistant (PDA), a hybrid PDA/mobile phone, a mobile phone, a smartphone, a wearable computing device, a digital media player, a tablet computer, a gaming console or controller, a kiosk, an augmented reality device, another wireless device, a set-top or other television box, one or more servers, and the like. The user device 503 may include similar hardware to that illustrated as being included in computing system 502, such as a display, processing unit, network interface, memory, operating system, etc.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   identifying a first non-fungible token ("NFT") stored on a blockchain, wherein data stored on the blockchain indicates the first non-fungible token is owned by a first blockchain address;
   receiving a cryptographically signed message indicating or representing that an individual approves of a second NFT at least one of (a) being created with content that is based at least in part on the first NFT, or (b) being recorded in one or more blockchain records as including content approved by the first blockchain address that owns the first NFT;
   cryptographically authenticating, using a public key that comprises or is determined from the first blockchain address, that the individual controls the first blockchain address, wherein the authenticating comprises confirming that a cryptographic signature of the cryptographically signed message is consistent with the public key for the first blockchain address;
   in response to the authenticating of the cryptographically signed message indicating or representing that the individual approves of the second NFT, generating data for storage in a new blockchain record, wherein the data for storage in the new blockchain record identifies at least: (a) a first identifier of the first NFT, (b) a second identifier of the second NFT, and (c) an indication that the first blockchain address provided approval of the second NFT; and
   causing the new blockchain record, including the new data, to be stored in a distributed blockchain maintained across a plurality of blockchain nodes.

2. The computer-implemented method of claim 1, wherein the new blockchain record comprises the second NFT, wherein causing the new blockchain record to be stored in the distributed blockchain comprises minting the second NFT to the distributed blockchain.

3. The computer-implemented method of claim 1, wherein the new blockchain record is created after the second NFT has been stored on one or more blockchains, wherein the new blockchain record includes identification information uniquely identifying the second NFT.

4. The computer-implemented method of claim 1, wherein the new blockchain record is stored on a different blockchain network than the second NFT is stored on.

5. The computer-implemented method of claim 1, further comprising:
   prior to generating the data for storage in the new blockchain record, determining license terms granted by a creator of the first NFT to whomever owns the first NFT; and
   confirming that the license terms indicate that the individual that controls the first blockchain address, as current owner of the first NFT, is permitted by the creator of the first NFT to grant the approval for the second NFT as indicated in the cryptographically signed message.

6. The computer-implemented method of claim 1, wherein the first NFT is owned by an organization with ownership interest in one or more live sporting events and represents at least a portion of media recorded during a specific sporting event.

7. The computer-implemented method of claim 1, wherein the first NFT comprises a work of art stored as a first image, wherein the second NFT comprises a second image with at least one visual similarity to the work of art.

8. The computer-implemented method of claim 1, wherein the indication that the first blockchain address provided approval of the second NFT, as stored in the new blockchain record, comprises a first cryptographic signature received as part of the cryptographically signed message, wherein the first cryptographic signature can be independently confirmed by a plurality of third-party entities to have been generated by a device with access to a private key of the first blockchain address.

9. A computer system comprising:
   memory; and
   a processor in communication with the memory and configured with processor-executable instructions to perform operations comprising:
      identifying a first non-fungible token ("NFT") stored on a blockchain, wherein data stored on the blockchain indicates the first non-fungible token is owned by a first blockchain address;
      receiving a cryptographically signed message indicating or representing that an individual approves of a second NFT at least one of (a) being created with content that is based at least in part on the first NFT, or (b) being recorded in one or more blockchain records as including content approved by the first blockchain address that owns the first NFT;
      cryptographically authenticating, based on a signature of the cryptographically signed message, that the individual controls the first blockchain address;
      in response to the authenticating of the cryptographically signed message indicating or representing that the individual approves of the second NFT, generating data for storage in a new blockchain record, wherein the data for storage in the new blockchain record identifies at least: (a) a first identifier of the first NFT, (b) a second identifier of the second NFT, and (c) an indication that the first blockchain address provided approval of the second NFT; and
      causing the new blockchain record, including the new data, to be stored in a distributed blockchain maintained across a plurality of blockchain nodes.

10. The computer system of claim 9, wherein the new blockchain record comprises the second NFT, wherein causing the new blockchain record to be stored in the distributed blockchain comprises minting the second NFT to the distributed blockchain.

11. The computer system of claim 9, wherein the cryptographically authenticating that the individual controls the first blockchain address comprises confirming that a cryptographic signature of the cryptographically signed message is consistent with the public key for the first blockchain address.

12. The computer system of claim 9, wherein the cryptographically authenticating that the individual controls the first blockchain address comprises confirming that a cryptographic signature of the cryptographically signed message is consistent with a public key of a proxy address previously associated with the first blockchain address by an owner of the first blockchain address.

13. The computer system of claim 9, wherein the new blockchain record is created after the second NFT has been stored on one or more blockchains, wherein the new blockchain record includes identification information uniquely identifying the second NFT.

14. The computer system of claim 9, wherein the new blockchain record is stored on a different blockchain network than the second NFT is stored on.

15. The computer system of claim 9, wherein the operations further comprise:
  prior to generating the data for storage in the new blockchain record, determining license terms granted by a creator of the first NFT to whomever owns the first NFT; and
  confirming that the license terms indicate that the individual that controls the first blockchain address, as current owner of the first NFT, is permitted by the creator of the first NFT to grant the approval for the second NFT as indicated in the cryptographically signed message.

16. The computer system of claim 9, wherein the first NFT is owned by an organization with ownership interest in one or more live sporting events and represents at least a portion of media recorded during a specific sporting event.

17. The computer system of claim 9, wherein the first NFT comprises a work of art stored as a first image, wherein the second NFT comprises a second image with at least one visual similarity to the work of art.

18. The computer system of claim 9, wherein the indication that the first blockchain address provided approval of the second NFT, as stored in the new blockchain record, comprises a first cryptographic signature received as part of the cryptographically signed message, wherein the first cryptographic signature can be independently confirmed by a plurality of third-party entities to have been generated by a device with access to a private key of the first blockchain address.

19. A computer-readable, non-transitory storage medium storing a smart contract comprising computer executable instructions that, when executed by a computer system operating as a blockchain node, configure the blockchain node to perform operations comprising:
  identifying a first non-fungible token ("NFT") stored on a blockchain, wherein data stored on the blockchain indicates the first non-fungible token is owned by a first blockchain address;
  receiving a cryptographically signed message indicating or representing that an individual approves of a second NFT at least one of (a) being created with content that is based at least in part on the first NFT, or (b) being recorded in one or more blockchain records as including content approved by the first blockchain address that owns the first NFT;
  cryptographically authenticating, based on a signature of the cryptographically signed message, that the individual controls the first blockchain address;
  in response to the authenticating of the cryptographically signed message indicating or representing that the individual approves of the second NFT, generating data for storage in a new blockchain record, wherein the data for storage in the new blockchain record identifies at least: (a) a first identifier of the first NFT, (b) a second identifier of the second NFT, and (c) an indication that the first blockchain address provided approval of the second NFT; and
  causing the new blockchain record, including the new data, to be stored in a distributed blockchain maintained across a plurality of blockchain nodes.

20. The computer-readable, non-transitory storage medium of claim 19, wherein the operations further comprise:
  receiving, from a requesting device, a request to identify derivative tokens of the smart contract that are based on the first NFT, wherein the request includes an identifier of the first NFT;
  identifying, based on the new blockchain record as stored in an instance of distributed blockchain, that the second NFT was authorized as a derivative work of the first NFT; and
  sending, to the requesting device, at least an identifier of the second NFT in response to the request.

\* \* \* \* \*